United States Patent
Shringeri et al.

(10) Patent No.: US 6,640,226 B1
(45) Date of Patent: Oct. 28, 2003

(54) RANKING QUERY OPTIMIZATION IN ANALYTIC APPLICATIONS

(75) Inventors: Sanjatha Shringeri, Union City, CA (US); Joy Hsu, Fremont, CA (US)

(73) Assignee: Informatica Corporation, Palo Alto, CA (US)

( * ) Notice: Subject to any disclaimer, the term of this patent is extended or adjusted under 35 U.S.C. 154(b) by 178 days.

(21) Appl. No.: 09/885,666

(22) Filed: Jun. 19, 2001

(51) Int. Cl.$^7$ .............................................. G06F 17/30
(52) U.S. Cl. ................................. 707/5; 707/4
(58) Field of Search ............................. 707/1, 2, 3, 4, 707/5, 6, 7, 8, 9, 10, 101, 102, 103, 104

(56) References Cited

U.S. PATENT DOCUMENTS

| | | | | |
|---|---|---|---|---|
| 5,404,513 A | * | 4/1995 | Powers et al. ............... | 707/102 |
| 5,713,020 A | * | 1/1998 | Reiter et al. ................. | 707/3 |
| 5,822,751 A | * | 10/1998 | Gray et al. ................... | 707/2 |
| 6,446,059 B1 | * | 9/2002 | Berger et al. ................ | 707/2 |

* cited by examiner

Primary Examiner—Charles Rones
Assistant Examiner—Yicun Wu
(74) Attorney, Agent, or Firm—Wagner, Murabito & Hao LLP

(57) ABSTRACT

A method of optimizing ranking queries in analytic applications. The method involves dividing a ranking query constructed by a user into multiple sub-commands. These sub-commands are based on the relationship between the foreign key and ranking attributes of a table of data and are run as a batch of commands. As usable data is extracted from each sub-command, it is stored and the foreign key is used as a filter for the next query in the batch. This eliminates accessing irrelevant data and facilitates the query operation. The extracted data is joined as the last step of the process in order to minimize the number of join operations performed by the query while the batch is being executed, thereby facilitating the query process.

17 Claims, 5 Drawing Sheets

RANKING QUERY OPTIMIZATION IN ANALYTIC APPLICATIONS

FIELD OF THE INVENTION

The present invention relates to data management systems. More particularly, the present invention pertains to a method and system for optimizing ranking queries in analytic applications.

BACKGROUND ART

Due to the increased amounts of data being generated, stored, and processed today, operational databases are constructed, categorized, and formatted for operational efficiency (e.g., throughput, processing speed, and storage capacity). The raw data found in these operational databases often exist as rows and columns of numbers and code that appear bewildering and incomprehensible to business analysts and decision makers. Furthermore, the scope and vastness of the raw data stored in modern databases render it harder locate usable information. Hence, "analytic applications" have been developed in an effort to help interpret, analyze, and compile the data so that it may be more readily understood by a business analyst. These applications map, sort, categorize, and summarize the raw data before it is presented for display, so that individuals can interpret data and use it as the basis for making decisions.

Given the many different types of source data available, and the many ways that the source data can be transformed and combined, enormous amounts of data are available that can be difficult for a user to navigate. This is especially true for users who are executing multiple rankings in a single query. An example is a user who needs to know the top 10 products of the top 10 customers. Currently, this query is conducted by combining the tables of sales, customers, and products. Then, the needed data are extracted and presented to the user. A search of this sort generates huge amounts of data as the tables multiply each other as they are joined.

When multiple data tables are joined, the typical analytic application will yield a Cartesian product. This means the application joins the tables in all possible ways and then discards data it does not need. For example, if a company has 100,000 customers and 1000 products, a table with 100,000,000 entries can be generated. This is very resource expensive in terms of the processing power needed and the time spent generating this table. For every additional ranking that occurs in the query, the multiplication of entries continues. This means that huge tables of data are generated before usable data are extracted. This is a problem for today's analytic applications because typical queries involve accessing a large number of tables in a single query. The current trend is toward increasing levels of detail in reports, which will involve accessing even greater numbers of tables in query searches.

Hence, it is desirable to facilitate access to relevant information in the databases defined by analytic applications, especially when conducting queries which are performing multi-level ranking operations. It is also desirable for the user to be able to conduct such a query without generating excess data which must be sorted through. The present invention provides a method and system that meet the above needs.

SUMMARY OF THE INVENTION

Accordingly, the present invention will facilitate the access of information in databases defined by analytic applications, especially when conducting multi-level ranking queries. Users can conduct multi-level ranking queries without generating excess data and wasting valuable resources. These and other objects and advantages of the present invention and others not specifically recited above will be described in more detail herein.

Embodiments of the invention are directed to a method of optimizing ranking queries in analytic applications. In one embodiment, a query ranking command constructed by a user is divided into a series of sub-commands which are executed sequentially as a batch command. As data are extracted from each sub-command, it is stored and used to filter out unnecessary data for the next query in the batch. By dividing the query into smaller components, the invention prevents the analytic application from generating excess data, thereby speeding the query process. The extracted data are joined after the last sub-command is completed. This keeps the size of the tables to a minimum while the query is in progress which also speeds the query process.

BRIEF DESCRIPTION OF THE DRAWINGS

The accompanying drawings, which are incorporated in and form a part of this specification, illustrate embodiments of the present invention and together with the description, serve to explain the principles of the invention.

DETAILED DESCRIPTION OF THE INVENTION

A system and method for navigating data generated using an analytic application is described. While numerous details are set forth in order to provide a thorough understanding of the present invention, it should be understood that it is not intended to limit the invention to this particular embodiment alone. On the contrary, the invention is intended to cover alternatives, modifications and equivalents, which may be included within the spirit and scope of the invention as defined by the appended claims. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating", "receiving", "executing", "extracting", "presenting", "joining", "dividing", and "storing" or the like, can refer to the actions and processes (e.g., processes 300 and 400 of FIGS. 3 and 4) of a computer system or similar electronic computing device. The computer system, or similar electronic computing device, manipulates and transforms data represented as physical (electronic) quantities within the computer system's registers and memories into other data similarly represented as physical quantities within the computer system memories or registers or other such information storage, transmission, or display devices.

Figure 1:
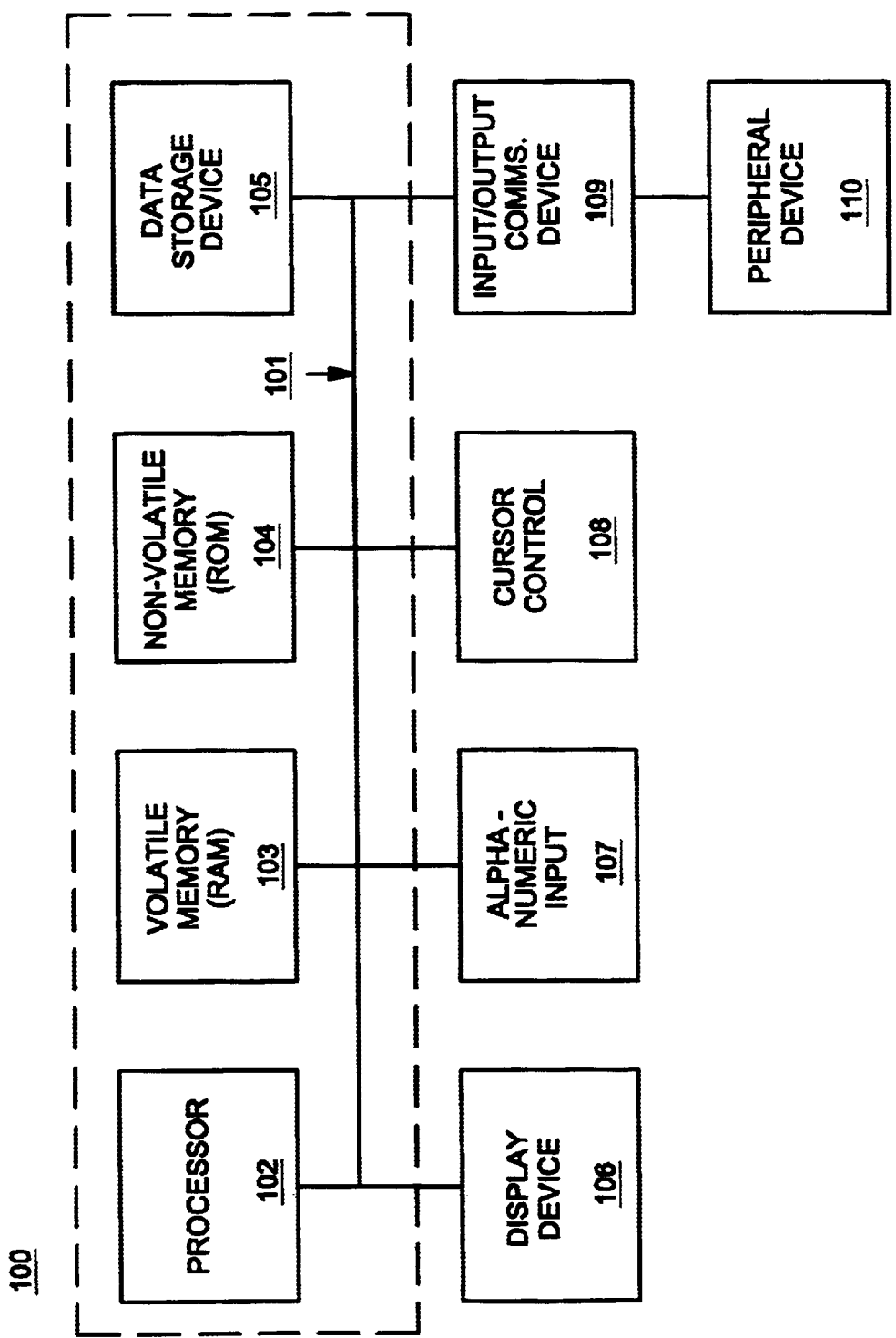
FIG. 1 is a block diagram of an exemplary computer system upon which embodiments of the present invention may be practiced.

With reference to FIG. 1, portions of the present invention are comprised of computer-readable and computer-executable instructions that reside, for example, in computer system 100 which can be used as a part of a general purpose computer network. It is appreciated that computer system 100 of FIG. 1 is exemplary only and that the present invention can operate within a number of different computer systems including general-purpose computer systems, embedded computer systems, laptop computer systems, hand-held computer systems, and stand-alone computer systems.

In the present embodiment, computer system 100 includes an address/data bus 101 for conveying digital information between the various components, a central processor unit (CPU) 102 for processing the digital information and instructions, a volatile main memory 103 comprised of volatile random access memory (RAM) for storing the digital information and instructions, and a non-volatile read only memory (ROM) 104 for storing information and instructions of a more permanent nature. In addition, computer system 100 may also include a data storage device 105 (e.g., a magnetic, optical, floppy, or tape drive or the like) for storing vast amounts of data. It should be noted that the software program for performing the ranking querying process of the present invention can be stored either in volatile memory 103, data storage device 105, or in an external storage device (not shown).

Devices which are optionally coupled to computer system 100 include a display device 106 for displaying information to a computer user, an alphanumeric input device 107 (e.g., a keyboard), and a cursor control device 108 (e.g., mouse, trackball, light pen, etc.) for inputting data, selections, updates, etc. Computer system 100 can also include a mechanism for emitting an audible signal (not shown).

Referring still to FIG. 1, optional display device 106 of FIG. 1 may be a liquid crystal device, cathode ray tube, or other display device suitable for creating graphic images and alpha-numeric characters recognizable to a user. Optional cursor control device 108 allows the computer user to dynamically signal the two dimensional movement of a visible symbol (cursor) on a display screen of display device 106. Many implementations of cursor control device 108 are known in the art including a trackball, mouse, touch pad, joystick, or special keys on alpha-numeric input 107 capable of signaling movement of a given direction or manner of displacement. Alternatively, it will be appreciated that a cursor can be directed and/or activated via input from alpha-numeric input 107 using special keys and key sequence commands. Alternatively, the cursor may be directed and/or activated via input from a number of specially adapted cursor directing devices.

Furthermore, computer system 100 can include an input/output (I/O) signal unit (e.g., interface) 109 for interfacing with a peripheral device 110 (e.g., a computer network, modem, mass storage device, etc.). Accordingly, computer system 100 may be coupled in a network, such as a client/server environment, whereby a number of clients (e.g., personal computers, workstations, portable computers, minicomputers, terminals, etc.) are used to run processes for performing desired tasks (e.g., inventory control, payroll, billing, etc.).

Figure 2:
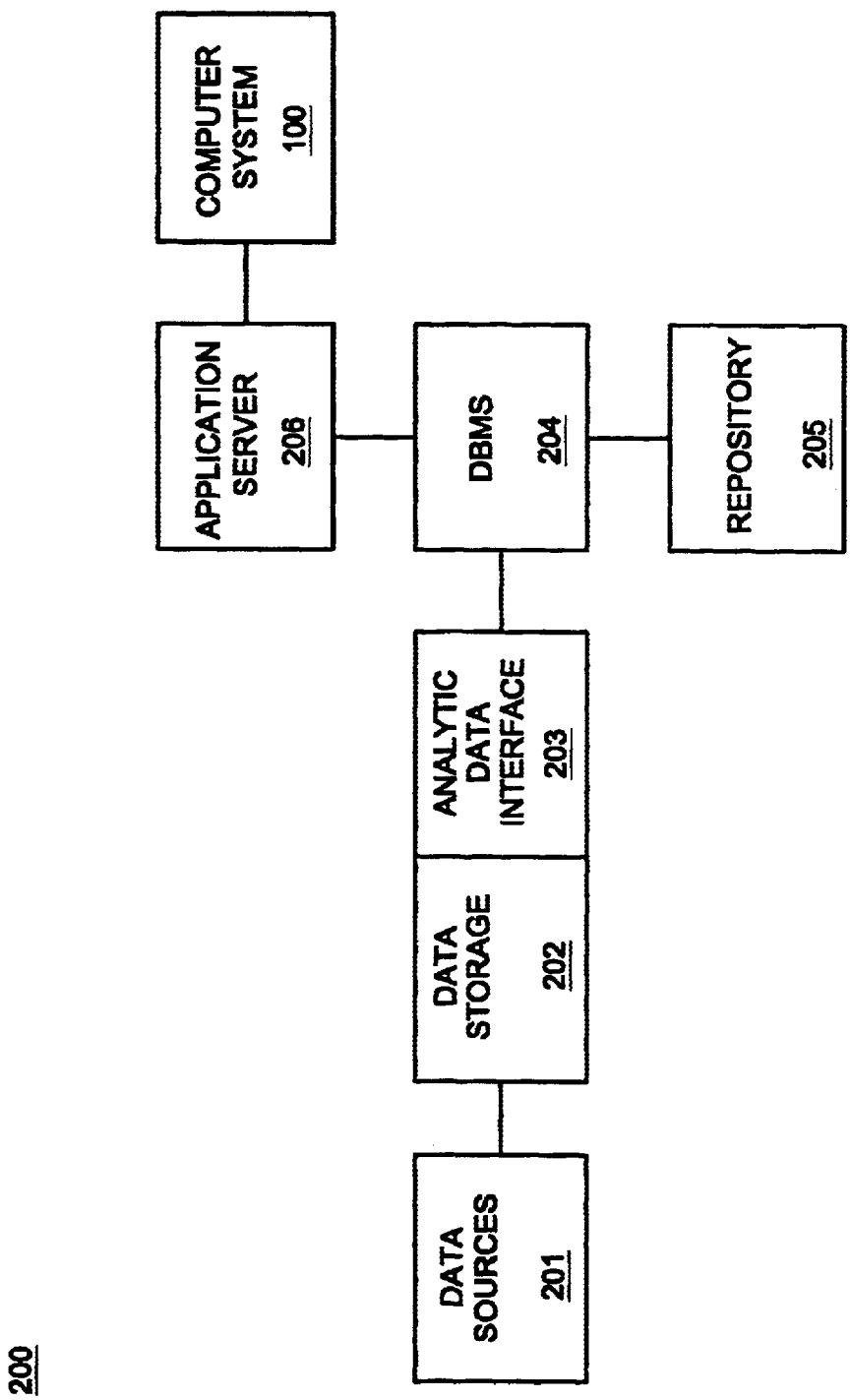
FIG. 2 is a block diagram of an exemplary system for implementing an analytic application upon which embodiments of the present invention may be practiced.

FIG. 2 illustrates one embodiment of a system 200 for implementing an analytic application in accordance with the present invention. Data sources 201 includes one or more sources of operational data resulting from business and financial transactions, equipment performance logs, and the like. These data sources can be based on and formatted according to a Relational Database Management System (RDBMS) (such as from Oracle, Informix, Sybase, Microsoft, etc.), and Enterprise Resource Planning (ERP) system, Service Advertising Protocol (SAP), flat files, and other data transmission formats, either planned or envisioned including XML, WML, HDML, HTML, and I-mode HTML.

Data storage 202 is for storing operational data and the like from data sources 201, typically using a high capacity mass storage device (such as hard disk drives, optical drives, tape drives, etc.). In one embodiment, data storage 202 is a data warehouse. Data storage 202 is coupled to a database management system (DBMS) 204 by analytic data interface 203. DBMS 204 executes an analytic application such as a data mart application. A repository 205 is coupled to (or integrated with) DBMS 204 for storing information from the database management system.

In one embodiment, data are generated using a process such as the Transformation Definition Language (TDL) process described in U.S. Pat. No. 6,014,670, assigned to the assignee of the present invention and hereby incorporated by reference. There are at least three styles of calculating data (e.g., business metrics): periodic, on demand, and continuous (real time). In the periodic style, data are calculated at predetermined intervals (e.g., hourly, daily, weekly, etc.) and stored in repository 205, and the most recent data are provided to the requester. In the on demand style, the data are calculated in response to a user request. These data may be cached or persisted in some manner (e.g., in repository 205), but do not exist or have value until they are initially requested. In the continuous (real time) style, data are updated as underlying data are updated. For example, a business metric describing the moving average for the inventory of a particular item gets updated as the inventory level for that item is updated. In each case, the requester gets the freshest data.

It is appreciated that business metrics can include any number of either the commonly used metrics for measuring business performance and efficiency, or unique business metrics defined by a user of an analytic application. Business metrics include, but are not limited to, measures of accounts receivable, accounts payable, general ledger, and cash flow. Metrics for accounts receivable can include, but are not limited to: accounts receivable balances, accounts receivable transactions, quality of sales, receivables-to-sales ratio, average collection period, customer credit reports, days outstanding, ratio of cash receipts to billed sales and payments in progress, ratio between ending accounts receivable balance and sum of billed sales, progress payments and beginning balances, ratio of ending receivables balance to cash receipts, accounts receivable turnover, average receivables amount, aging receivables by period, day of sales in receivables ratio, and current period collection rate. Metrics for accounts payable can include, but are not limited to: accounts payable balances, accounts payable transactions, quality of purchase, accounts payable turnover ratio, disbursements-to-payables ratio, days outstanding, payables-to-purchase ratio, average payment period, vendor credit analysis, ratio of cash disbursements to invoiced receipts, ratio between ending accounts payable balances and sum of incoming invoiced amounts, progress payments and beginning balances, ratio of ending payables balance to cash disbursements, payables-to-sales ratio, average payables amount, aging payables by period, day of purchase in payables ratio, and current period payment rate. General ledger metrics can include, but are not limited to: account balances, balance sheet plus profit/loss statement, revenues, costs, gross margins, and net profits. Cash flow metrics can include, but are not limited to: projected cash flow from receivables, cash flow from operations, and cash on hand.

Referring still to FIG. 2, in the present embodiment, an application server 206, exemplified by computer system 100 in FIG. 1, is interposed between the DBMS 204 and a computer system 100 as exemplified in FIG. 1. Application server 206 may incorporate DBMS 204 and repository 205, or these may be separate entities.

Figure 3:
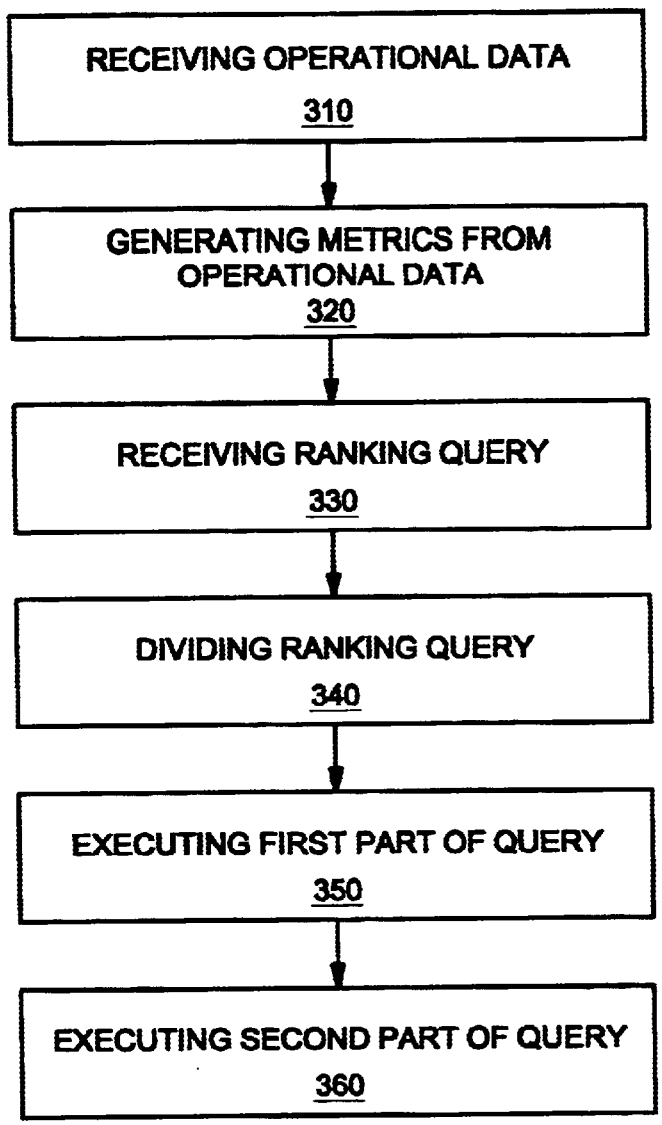
FIG. 3 is a flowchart showing the steps in a process for navigating an analytic application using a ranking query command, in accordance with one embodiment of the present invention.
Figure 4:
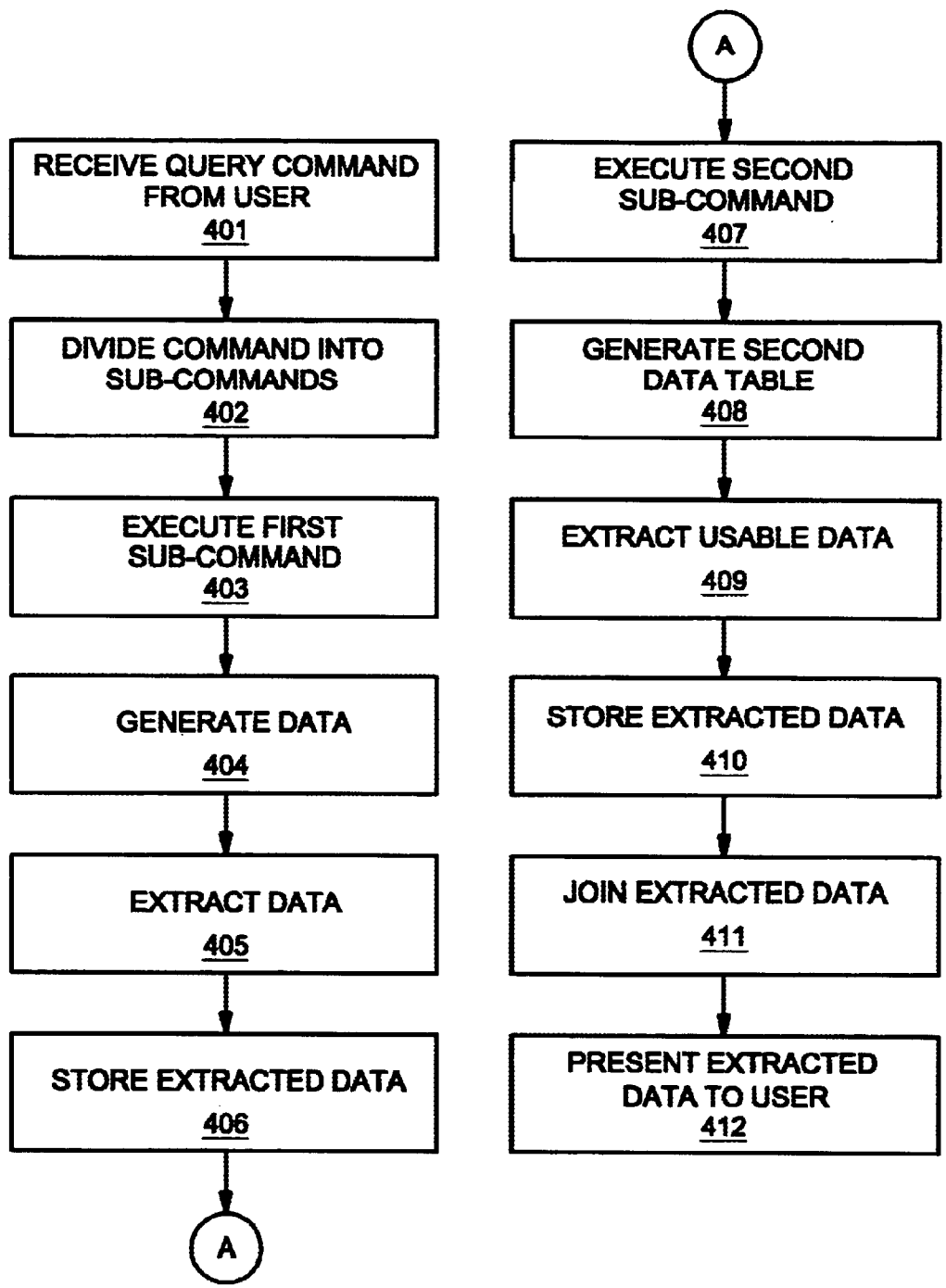
FIG. 4 is a flowchart showing the steps in a process for facilitating access to database information defined by an analytic application, in accordance with one embodiment of the present invention.

FIGS. 3 and 4 are flowcharts showing the steps in a processes 300 and 400 for navigating and accessing data (including business metrics, processed data, and raw data) defined by an analytic application in accordance with one embodiment of the present invention. Processes 300 and 400 can be implemented via computer-readable program instructions stored in a memory unit (e.g., volatile memory 103, non-volatile memory 104, and/or data storage device 105) and executed by processor 102 of computer system 100 (FIG. 1). However, it is appreciated that portions of processes 300 and 400 can be implemented on different computer systems that are linked in a computer system network. In addition, it is understood that the steps in processes 300 and 400 can be repeated as necessary.

It is further appreciated, as an integral feature of the present embodiment, that the relationship of the keys be defined as a one to one relationship. A primary key is an attribute or set of attributes that uniquely identify a value in a data field. A foreign key is an attribute or set of attributes whose values are the same as the primary key of another table. It can be thought of as a copy of the primary key of another relational table. The relationship is made between two relational tables by matching the values of the foreign key in one table with the values of the primary key in another. Keys are fundamental to the concept of relational databases because they enable tables in the database to be related with each other. Navigation around a relational database depends of the ability of the key to unambiguously identify specific values in a table. In the present embodiment of the invention, for a given key, there can be no repeating values of data and each value relates to a unique value in another key. For example, in a key whose attributes are social security numbers, each number is unique. Further, no particular number may be assigned to more than one person.

In step 310 of process 300, operational data are received from a data source (e.g., data sources 201 of FIG. 2). In step 320, the metrics are generated using an analytic application such as the TDL process described in the above referenced U.S. Pat. No. 6,014,670. In step 330, a ranking query is received from the user. This query requires multiple successive rankings of data in order to provide usable data to the user. In step 340, the ranking query is divided into multiple sub-commands which are run as a batch by the invention. The result of a sub-command is used as a filter of the data available to the following sub-command. In step 350, the first part of the query is executed. This is the first level in a multi-level ranking query. The results from this first part are used as a filter for the next part of the ranking query. In step 360, the second part of the ranking query is executed. These data are joined with the first part of the ranking query to provide the data requested by the user in step 330.

In step 401 of FIG. 4, with reference also to FIG. 2, the user inputs a query command to the computer system 100. In the present embodiment of the invention, the query is a ranking query of raw data held in data repository 205 of FIG. 2. In step 402, the ranking query command input by the user in step 401 is divided by the present invention into sub-commands. This is done in accordance with one embodiment of the present invention in order to facilitate access to the information. In step 403, the computer executes the first sub-command in the ranking query and retrieves the relevant data in repository 205. In data repository 205, the data are stored in a central table called the fact table. In the fact table are two types of fields of data: the fields storing individual facts, and the fields storing foreign keys. The individual facts are simply the metrics generated and stored as a function of business operations such as number, amount, or price. The foreign keys can be thought of as links between tables which enable tables in the database to be related with each other. In step 404, a table of data is generated from the retrieved data. The individual facts are combined with the keys to create this table of usable data. In step 405, the data required in the first sub-command are extracted from the table of data. The table of organized data is assessed, and data needed to complete the first sub-command are set aside. In step 406, the extracted data are stored. This stored data will later be joined with other saved data to form the table of information the user is creating. It is also used as a filter for the next sub-command. This filtering prevents the second sub-command from accessing irrelevant data and thus speeds the query process.

In step 407, the second sub-command in the ranking query is executed and the relevant data in repository 205 are retrieved. In step 408, a second table of data are generated from the data accessed in data repository 205. Again, the facts are combined with the keys to form a table of information. In step 409, the data required in the second sub-command are extracted from the second table of data. Again, the second table of organized data is assessed, and data needed to complete the second sub-command are set aside. In step 410, the extracted data are stored in order to be joined with other data or as a filter for any subsequent sub-commands. In step 411, the saved data are joined with the saved data from the first sub-command to form the table of usable information sought by the user. By making the join operation the last step in the process, the most recently extracted data can be used as a filter for subsequent subcommands. This keeps each successive table generated as small as possible because the domain of possible values is reduced by the filter. Also, no resources are used to perform join operations while the query is being run, which speeds the query operation. In step 412, the table of data is presented to the user.

Figure 5:
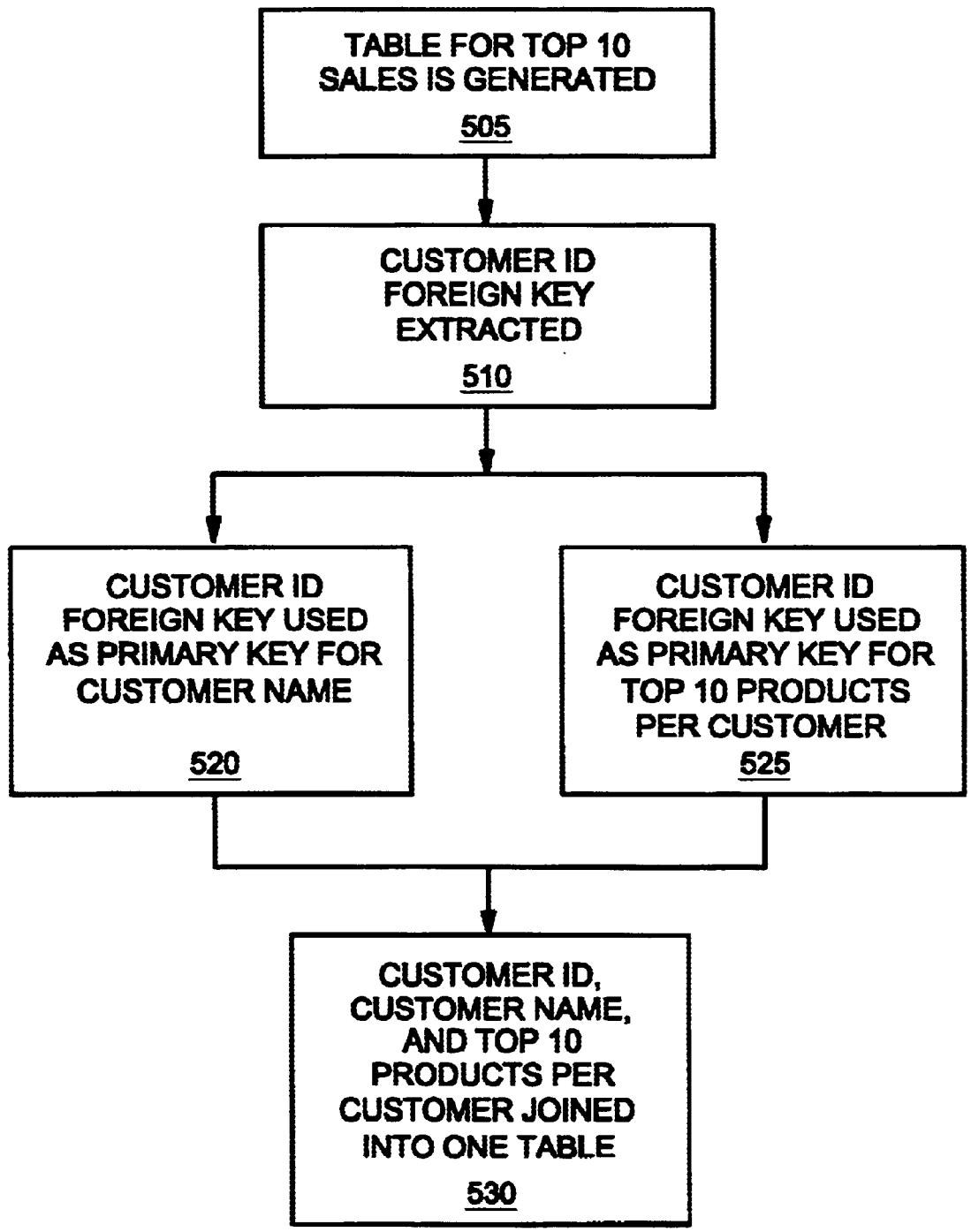
FIG. 5 is an example of a ranking query chain performed in accordance with the present invention.

An example of an embodiment of the current invention is illustrated in FIG. 5. A query of the top 10 products of the top 10 customers by gross sales is made by the user. The user defines the parameters of the query and runs the command. The present invention divides this command into subcommands. In step 505 of FIG. 5, the first sub-command is executed to find the top 10 customers based on gross sales. The data repository is searched, and the table for gross sales per customer is accessed. The gross sales attribute is ranked in descending order, and the top 10 values are selected. These top 10 values are stored. The foreign key in this table is the customer ID field. For the purposes of this example, the customer ID is a unique number assigned to each customer to identify them in the company's records. As was stated earlier, there is a one to one relationship between the foreign key and the ranking attribute in each table. In step 510 of FIG. 5, this foreign key is extracted to be used as a filter for subsequent searches. In step 520 of FIG. 5, a second sub-command is run to get the customer name associated with the customer ID. The search of the database is limited to these 10 customers only and not the entire customer database. Accordingly, this will speed the query process as the customer database could possible have thousands of entries or more in it. This information is stored as the subsequent commands are run.

In step 525 of FIG. 5, a third sub-command is executed and the customer ID foreign key is used as the primary key to find the top 10 products purchased by each customer. Again, the products are ranked in the table generated in this query and the top 10 products per customer are stored. In step 530 of FIG. 5, the tables for customer ID, customer name, and the top 10 products for each customer are joined to create the table of data the user requested.

The preferred embodiment of the present invention, a method of optimizing ranking queries in analytic applications, is thus described. While the present invention has been described in particular embodiments, it should be appreciated that the present invention should not be construed as limited by such embodiments, but rather construed according to the below claims.

What is claimed is:

1. A method for facilitating access to database information defined by an analytic application, said method comprising the steps of:
   a) receiving operational data from a data source;
   b) generating metrics from said operational data using said analytic application;
   c) receiving a multi-level ranking query from a user, wherein said multi-level ranking query requires successive rankings of said metrics;
   d) dividing said multi-level ranking query into a first part that defines a first subset of the metrics from said operational data and a second part that defines a second subset of the metrics from said operational data;
   e) executing said first part of said multi-level ranking query, wherein said first part executes a first ranking of said first subset only;
   f) executing said second part of said multi-level ranking query, wherein said second part executes a second ranking of metrics from said first ranking; and
   g) joining stored usable data extracted from a first table of data that is generated as a result of said first ranking with stored usable data extracted from a second table of data that is generated as a result of said second ranking.

2. The method as recited in claim 1, wherein said method further comprises the steps of:
   dividing said ranking query into a plurality of sub-commands;
   executing a first or said plurality of sub-commands;
   generating a first table of data as a result of executing said first sub-command;
   extracting usable data from said first table of data as a result of executing said first sub-command;
   storing said usable data extracted from said first table of data;
   executing a second of said plurality of sub-commands;
   generating a second table of data as a result of executing said second sub-command;
   extracting usable data from said second table of data as a result of executing said second sub-command;
   storing said usable data extracted from said second table of data;
   joining said stored usable data extracted from said first table of data with said stored usable data extracted from said second table of data; and
   presenting said joined data to said user.

3. The method of claim 2, wherein said steps are performed automatically.

4. The method of claim 2, wherein said joining of stored data is performed after said first sub-command and said second sub-command.

5. The method of claim 2, wherein said extracted data from said first table of data is used to limit the size of said second table of data.

6. The method of claim 5, wherein the foreign key from said first table of data is used as a primary key for said second table of data.

7. A computer system comprising:
   a bus;
   a memory unit coupled to said bus; and
   a processor coupled to said bus, said processor for executing a method for facilitating access to database information defined by an analytic application, said method comprising the steps of:
   a) receiving operational data from a data source;
   b) generating metrics from said operational data using said analytic application;
   c) receiving a multi-level ranking query from a user, wherein said multi-level ranking query requires succesive rankings of said metrics;
   d) dividing said multi-level ranking query into a first part that defines a first subset of the metrics from said operational data and a second part that defines a second subset of the metrics from said operational data;
   e) executing said first part of said multi-level ranking query, wherein said first part executes a first ranking of said first subset only;
   f) executing said second part of said multi-level ranking query, wherein said second part executes a second ranking of metrics from said first ranking; and
   g) joining stored usable data extracted from a first table of data that is generated as a result of said first ranking with stored usable data extracted from a second table of data that is generated as a result of said second ranking.

8. The computer system as recited in claim 7, wherein said method further comprises the steps of:

dividing said ranking query into a plurality of sub-commands;

executing a first of said plurality of sub-commands;

generating a first table of data as a result of executing said first sub-command;

extracting usable data from said first table of data as a result of executing said first sub-command;

storing said usable data extracted from said first table of data;

executing a second of said plurality of sub-commands;

generating a second table of data as a result of executing said second sub-command;

extracting usable data from said second table of data as a result of executing said second sub-command;

storing said usable data extracted from said second table of data;

joining said stored usable data extracted from said first table of data with said stored usable data extracted from said second table of data; and presenting said joined data to said user.

9. The computer system of claim 8, wherein said steps are performed automatically.

10. The computer system of claim 8, wherein said joining of stored data is performed after said first sub-command and said second sub-command.

11. The computer system of claim 8, wherein said extracted data from said first table of data is used to limit the size of said second table of data.

12. The computer system of claim 11, wherein the foreign key from said first table of data is used as a primary key for said second table of data.

13. A computer usable medium having computer-readable program code embodied therein for causing a computer system to perform the steps of:

a) receiving operational data from a data source;

b) generating metrics from said operational data using said analytic application;

c) receiving a multi-level ranking query from a user, wherein said multi-level ranking query requires successive rankings of said metrics;

d) dividing said multi-level ranking query into a first part that defines a first subset of the metrics from said operational data and a second part that defines a second subset of the metrics from said operational data;

e) executing said first part of said multi-level ranking query, wherein said first part executes a first ranking of said first subset only;

f) executing said second part of said multi-level ranking query, wherein said second part executes a second ranking of metrics from said first ranking; and g) joining stored usable data extracted from a first table of data that is generated as a result of said first ranking with stored usable data extracted from a second table of data that is generated as a result of said second ranking.

14. The computer usable medium as recited in claim 13, wherein said method further comprises the steps of:

dividing said ranking query into a plurality of sub-commands;

executing a first of said plurality of sub-commands;

generating a first table of data as a result of executing said first sub-command;

extracting usable data from said first table of data as a result of executing said first sub-command;

storing said usable data extracted from said first table of data;

executing a second of said plurality of sub-commands;

generating a second table of data as a result of executing said second sub-command;

extracting usable data from said second table of data as a result of executing said second sub-command;

storing said usable data extracted from said second table of data;

joining said stored usable data extracted from said first table of data with said stored usable data extracted from said second table of data; and presenting said joined data to said user.

15. The computer usable medium of claim 14, wherein said steps are performed automatically.

16. The computer usable medium of claim 14, wherein said joining of stored data is performed after said first sub-command and said second sub command.

17. The method of claim 14, wherein a foreign key from said first table of data is used as a primary key for said second table of data.

* * * * *